United States Patent
Lim et al.

(10) Patent No.: US 12,334,585 B2
(45) Date of Patent: Jun. 17, 2025

(54) SEPARATOR MEDIA FOR ELECTROCHEMICAL CELLS

(71) Applicant: DUPONT SAFETY & CONSTRUCTION, INC., Wilmington, DE (US)

(72) Inventors: Hyun Sung Lim, Midlothian, VA (US); Pankaj Arora, Chesterfield, VA (US)

(73) Assignee: DUPONT SAFETY & CONSTRUCTION, INC., Wilmington, DE (US)

( * ) Notice: Subject to any disclaimer, the term of this patent is extended or adjusted under 35 U.S.C. 154(b) by 1360 days.

(21) Appl. No.: 15/931,732

(22) Filed: May 14, 2020

(65) Prior Publication Data

US 2020/0274122 A1    Aug. 27, 2020

Related U.S. Application Data

(63) Continuation of application No. 14/442,412, filed as application No. PCT/US2013/069127 on Nov. 8, 2013, now abandoned.

(60) Provisional application No. 61/726,168, filed on Nov. 14, 2012.

(51) Int. Cl.

| | |
|---|---|
| *H01M 50/44* | (2021.01) |
| *D01D 5/11* | (2006.01) |
| *D01D 10/02* | (2006.01) |
| *D01F 6/04* | (2006.01) |
| *D01F 6/06* | (2006.01) |
| *D04H 1/724* | (2012.01) |
| *D04H 3/007* | (2012.01) |
| *D04H 3/009* | (2012.01) |
| *D04H 3/011* | (2012.01) |
| *D04H 3/16* | (2006.01) |
| *D06M 11/54* | (2006.01) |
| *H01G 9/02* | (2006.01) |
| *H01G 11/52* | (2013.01) |
| *H01M 6/04* | (2006.01) |
| *H01M 10/24* | (2006.01) |
| *H01M 10/26* | (2006.01) |
| *H01M 10/34* | (2006.01) |
| *H01M 50/403* | (2021.01) |
| *H01M 50/417* | (2021.01) |
| *H01M 50/489* | (2021.01) |
| *H01M 50/491* | (2021.01) |
| *H01M 50/494* | (2021.01) |

(52) U.S. Cl.
CPC .............. *H01M 50/44* (2021.01); *D01D 5/11* (2013.01); *D01D 10/02* (2013.01); *D01F 6/04* (2013.01); *D04H 1/724* (2013.01); *D04H 3/011* (2013.01); *D04H 3/16* (2013.01); *D04H 3/166* (2013.01); *D06M 11/54* (2013.01); *H01G 9/02* (2013.01); *H01G 11/52* (2013.01); *H01M 6/045* (2013.01); *H01M 10/26* (2013.01); *H01M 50/403* (2021.01); *H01M 50/417* (2021.01); *H01M 50/489* (2021.01); *D01F 6/06* (2013.01); *D04H 3/007* (2013.01); *D04H 3/009* (2013.01); *H01M 10/24* (2013.01); *H01M 10/345* (2013.01); *H01M 50/491* (2021.01); *H01M 50/494* (2021.01); *H01M 2220/10* (2013.01); *H01M 2220/20* (2013.01); *Y02E 60/13* (2013.01)

(58) Field of Classification Search
None
See application file for complete search history.

(56) References Cited

U.S. PATENT DOCUMENTS

| | | | |
|---|---|---|---|
| 3,684,554 A | | 8/1972 | Donald et al. |
| 5,047,121 A | | 9/1991 | Kochar |
| 5,512,357 A | | 4/1996 | Shimura et al. |
| 6,403,265 B1 | | 6/2002 | Tanaka et al. |
| 7,744,989 B2 | | 6/2010 | Marin et al. |
| 2005/0092771 A1 | | 5/2005 | Ciavarella et al. |
| 2006/0147804 A1 | | 7/2006 | Yamamoto et al. |
| 2008/0220681 A1* | | 9/2008 | Marin .................... D04H 1/724 428/401 |
| 2013/0248175 A1 | | 9/2013 | Frisk et al. |
| 2014/0134498 A1 | | 5/2014 | Lim et al. |
| 2016/0276640 A1 | | 9/2016 | Lim et al. |

FOREIGN PATENT DOCUMENTS

| | | |
|---|---|---|
| EP | 0407953 A2 | 1/1991 |
| EP | 1047140 A1 | 10/2000 |
| EP | 1603176 A1 | 12/2005 |
| JP | H07122258 A | 5/1995 |
| JP | 2015536550 A | 12/2015 |
| KR | 20050092771 A | 9/2005 |
| WO | 2004029340 | 4/2004 |
| WO | 2004/073094 A1 | 6/2006 |

OTHER PUBLICATIONS

PCT International Search Report for International Application No. PCT/US2013/069127, mailed Feb. 18, 2014.

* cited by examiner

*Primary Examiner* — Arti Singh-Pandey

(57) ABSTRACT

A separator medium for electrochemical cells that contains at least one nonwoven sheet of polymeric fibers. The nonwoven sheet has a surface area of about 0.5 to about 1.5 m²/g and has a maximum pore size that is equal to or more than 2.5 times the mean flow pore size and more than 11 times the minimum pore size. The sheet may be sulfonated to a level of 0.67% and demonstrates superior tensile properties after sulfonation and relative to previously known separators.

14 Claims, No Drawings

SEPARATOR MEDIA FOR ELECTROCHEMICAL CELLS

This application is a continuing application of application Ser. No. 14/442,412 filed on May 13, 2015, now abandoned.

BACKGROUND OF THE INVENTION

1. Field of the Invention

This invention relates to the field of separators for electrochemical cells, and in particular alkaline batteries.

2. Description of the Related Art

Alkaline batteries have become increasingly more popular because of their high energy density. As such, these batteries are increasingly used in applications normally reserved for the traditional lead-acid battery systems.

In order to achieve extended battery life and efficiency in alkaline systems, the use of battery separators is required. The battery separators are located between the positive and negative plates so as to provide, (1) a separation between the electrodes of opposite charge, (2) an electrolyte reservoir, (3) a uniform electrolyte distribution across the electrode surface so as to permit uniform current density and (4) a space for electrode expansion.

Battery separators used in alkaline batteries at present are commonly formed of a polyolefin, preferably polypropylene, polyamide or nylon non-woven sheet.

One of the major deficiencies in nickel metal hydride (NiMH) battery systems is their high rate of self-discharge, that is, continuously losing their charge during storage. The "ammonia-shuttle" has major influence on the self-discharge. The nitrogen containing impurities in Ni electrode are oxidized to form nitrate which migrate through the separator to the cathode. The nitrate is reduced to ammonia at the cathode. The ammonia again passes through the separator and reaches the nickel electrode and the shuttle is completed.

SUMMARY OF THE INVENTION

The present invention is directed to a separator medium for electrochemical cell, where a electrochemical cell can be a battery or a capacitor. In one embodiment, the medium comprises at least one nonwoven sheet comprising polymeric fibers wherein the nonwoven sheet has a surface area of about 0.5 to about 1.5 $m^2/g$ and wherein the nonwoven sheet has a maximum pore size that is equal to or more than 2.5 times the mean flow pore size and more than 11 times the minimum pore size.

The present invention is directed to a separator medium for alkaline batteries, and in particular nickel metal hydride batteries. In one embodiment, the medium comprises at least one nonwoven sheet comprising polymeric fibers wherein the nonwoven sheet has a surface area of about 0.5 to about 1.5 $m^2/g$ and wherein the nonwoven sheet has a maximum pore size that is equal to or more than 2.5 times the mean flow pore size and more than 11 times the minimum pore size. In a further embodiment, the polymeric fibers are sulfonated and contain at least 0.67% by weight of sulfur. In a further embodiment, the separator retains at least 70% of its machine direction (MD) tensile strength relative to the medium when it is not subjected to sulfonation.

The invention is further directed to a process for producing a separator medium for electrochemical cells.

The invention is still further directed to an electrochemical cell wherein the cell is an alkaline battery comprising separator medium that further comprises at least one nonwoven sheet comprising polymeric fibers wherein the nonwoven sheet has a surface area of about 0.5 to about 1.5 $m^2/g$ and wherein the nonwoven sheet has a maximum pore size that is equal to or more than 2.5 times the mean flow pore size and more than 11 times the minimum pore size, the polymeric fibers are sulfonated and contain at least 0.67% by weight of sulfur and wherein the separator retains at least 70% of its machine direction (MD) tensile strength relative to the medium when it is not subjected to sulfonation.

DETAILED DESCRIPTION

Applicants specifically incorporate the entire contents of all cited references in this disclosure. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

Definitions

The term "polymer" as used herein, generally includes but is not limited to, homopolymers, copolymers (such as for example, block, graft, random and alternating copolymers), terpolymers, etc., and blends and modifications thereof. Furthermore, unless otherwise specifically limited, the term "polymer" shall include all possible geometrical configurations of the material. These configurations include, but are not limited to isotactic, syndiotactic, and random symmetries.

The term "polyolefin" as used herein, is intended to mean any of a series of largely saturated polymeric hydrocarbons composed only of carbon and hydrogen. Typical polyolefins include, but are not limited to, polyethylene, polypropylene, polymethylpentene, and various combinations of the monomers ethylene, propylene, and methylpentene.

The term "polyethylene" as used herein is intended to encompass not only homopolymers of ethylene, but also copolymers wherein at least 85% of the recurring units are ethylene units such as copolymers of ethylene and alpha-olefins. Preferred polyethylenes include low-density polyethylene, linear low-density polyethylene, and linear high-density polyethylene. A preferred linear high-density polyethylene has an upper limit melting range of about 130° C. to 140° C., a density in the range of about 0.941 to 0.980 gram per cubic centimeter, and a melt index (as defined by ASTM D-1238-57T Condition E) of between 0.1 and 100, and preferably less than 4.

The term "polypropylene" as used herein is intended to embrace not only homopolymers of propylene but also copolymers where at least 85% of the recurring units are propylene units. Preferred polypropylene polymers include isotactic polypropylene and syndiotactic polypropylene.

The term "nonwoven sheet" as used herein means a structure of individual fibers or threads that are positioned in a random manner to form a planar material without an identifiable pattern, as in a knitted fabric.

The term "plexifilament" as used herein means a three-dimensional integral network or web of a multitude of thin, ribbon-like, film-fibril elements of random length. Typically, these have a mean film thickness of less than about 4 micrometers and a median fibril width of less than about 25 micrometers. The average film-fibril cross sectional area if mathematically converted to a circular area would yield an effective diameter between about 1 micrometer and 25 micrometers. In plexifilamentary structures, the film-fibril elements intermittently unite and separate at irregular intervals in various places throughout the length, width and thickness of the structure to form a continuous three-dimensional network.

"Sulfonation" refers to chemical binding of sulfur containing moieties to at least a fraction of the polymer that the fiber comprises. Sulfonation can be carried out by any method known to one of skill in the art. For example, sulfonation can be carried out using the vapor phase surface sulfonation of webs described in U.S. Pat. No. 3,684,554. The basic process involves contacting the dry polymer web with continuous blast of gaseous $SO_3$ (2-15% volume in dry inert gas) that can run continuously at high speed (100-200 ft/sec). The sulfonated polymer web can be rinsed with DI water. Sulfonation may also be carried out by the process of U.S. Pat. No. 6,403,265 using concentrated sulfuric acid.

DESCRIPTION

The present invention overcomes the problems inherent in the currently used separators and provides a wettable sheet material with the desired tensile strength, ammonia absorption characteristic, electrolyte absorption and electrical resistance properties which is usable in alkaline batteries.

An object of the present invention is therefore to provide a wettable sheet material useful as a separator in alkaline batteries. Another object of the present invention is to provide a sheet material which is wettable by electrolyte and has good electrolyte absorption and ammonia absorption in an alkaline battery system.

The present invention is therefore directed to a separator medium for alkaline batteries, and in particular nickel metal hydride batteries. In one embodiment, the medium comprises at least one nonwoven sheet comprising polymeric fibers wherein the nonwoven sheet has a surface area of about 0.5 to about 1.5 $m^2/g$ and wherein the nonwoven sheet has a maximum pore size that is equal to or more than 2.5 times the mean flow pore size and more than 11 times the minimum pore size. In a further embodiment, the polymeric fibers are sulfonated and contain at least 0.67% by weight of sulfur. In a further embodiment, the separator retains at least 70% of its machine direction (MD) tensile strength relative to the medium when it is not subjected to sulfonation.

The polymeric fibers may comprise polymers selected from the group consisting of polyolefins, polyesters, polyamides, polyaramids, polysulfones, polyimides, fluorinated polymers and combinations thereof. When the polymeric fibers are made from polyolefin the polymers may be selected from the group consisting of polyethylene, polypropylene, polybutylene and polymethylpentene.

Suitable polymers for use in the alkaline battery separator also include aliphatic polyamide, semi-aromatic polyamide, polyvinyl alcohol, cellulose, polyethylene terephthalate, polypropylene terephthalate, polybutylene terephthalate, polysulfone, polyvinylidene fluoride, polymethyl pentene, polyphenylene sulfide, polyacetyl, polyacrylonitrile, polyurethane, aromatic polyamide and blends, mixtures and copolymers thereof. Polymers that are especially suitable for use in the alkaline battery separator include polyvinyl alcohol, cellulose, aliphatic polyamide and polysulfone.

The polymeric fibers can be plexifilamentary fiber strands. The polymeric fibers may furthermore have non-circular cross sections.

In a further embodiment, the nonwoven sheet is a uniaxially stretched nonwoven sheet where the stretching has taken place in the machine direction. The nonwoven sheet may furthermore have a surface area of about 0.5 to about 1.0 $m^2/g$.

In a still further embodiment the nonwoven sheet consists of fibers that have a number average fiber diameter greater than 1 micrometer for 100% of the fibers.

The nonwoven sheet may have an ammonia trapping of 0.20 mmole/g and a machine direction tensile strength retention of at least 16 Newtons/centimeter (N/cm.)

The invention is further directed to a process for producing a separator medium for electrochemical cells. The process comprises the steps of:

(i) Flash spinning a solution of 12% to 24% by weight polyethylene in a spin agent consisting of a mixture of normal pentane and cyclopentane at a spinning temperature from about 205° C. to 220° C. to form plexifilamentary fiber strands and collecting the plexifilamentary fiber strands into an unbonded web;

(ii) Uniaxially stretching the unbonded web in the machine direction between heated draw rolls at a temperature between about 124° C. and about 154° C., positioned between about 5 cm and about 30 cm apart and stretched between about 3% and 25% to form the stretched web; and (iii) Bonding the stretched web between heated bonding rolls at a temperature between about 124° C. and about 154° C. to form a nonwoven sheet wherein the nonwoven sheet has a surface area of about 0.5 to about 1.5 $m^2/g$ and a maximum pore size that is more than 2.5 times the mean flow pore size and more than 11 times the minimum pore size.

The process for producing a separator medium may further comprise sulfonating the nonwoven sheet after bonding the stretched web.

The invention is further directed to an electrochemical cell wherein the cell is an alkaline battery comprising separator medium that further comprises at least one nonwoven sheet comprising polymeric fibers wherein the nonwoven sheet has a surface area of about 0.5 to about 1.5 $m^2/g$ and wherein the nonwoven sheet has a maximum pore size that is equal to or more than 2.5 times the mean flow pore size and more than 11 times the minimum pore size, the polymeric fibers are sulfonated and contain at least 0.67% by weight of sulfur and wherein the separator retains at least 70% of its machine direction (MD) tensile strength relative to the medium when it is not subjected to sulfonation.

The battery can be an alkaline primary battery, e.g., Zinc-Manganese Oxide or Zn—$MnO_2$ battery in which the anode is zinc and the cathode is manganese oxide ($MnO_2$), or Zinc-Air battery in which the anode is zinc and the cathode is air, or it can be an alkaline secondary battery, e.g., a Nickel Cadmium battery in which the anode is cadmium and the cathode is Nickel oxy-hydroxide (NiOOH), Nickel Zinc or Ni—Zn battery in which the anode is zinc and the cathode is NiOOH, Nickel Metal Hydride (NiMH) battery in which the anode is metal hydride (e.g. $LaNi_5$) and the cathode is NiOOH or Nickel-Hydrogen or $NiH_2$ battery in which the anode is hydrogen (H$_2$) and the cathode is NiOOH. Other types of alkaline batteries include Zinc/Mercuric Oxide in which the anode is zinc, and the cathode is mercury oxide (HgO), Cadmium/Mercuric Oxide in which the anode is cadmium and the cathode is mercury oxide, Zinc/Silver Oxide in which the anode is zinc and the cathode is silver oxide (AgO), Cadmium/Silver Oxide in which the anode is cadmium and the cathode is silver oxide. All of these battery types use 30-40% potassium hydroxide as the electrolyte.

The alkaline battery of this embodiment of the invention can include a separator having an ionic resistance of less than about 300 milliohms-cm$^2$, preferably less than 200 milliohms-cm$^2$, most preferably less than 100 mohms-cm$^2$, as measured in 35% potassium hydroxide electrolyte solution at 1 KHz.

In some embodiments of the invention, it may be preferable to crosslink the polymeric fine fibers in order to maintain the porous structure and improve the structural integrity of the separator in the electrolyte.

In some embodiments of the invention, it may be preferable to coat the separators with surfactants prior to forming into a battery in order to improve the wettability and wicking properties in 30-40% KOH electrolyte. The surfactant is one that is stable in a strong alkaline environment, such as an ionic surfactant. Alternatively, the separators can undergo acrylic acid grafting to improve the wettability of separators.

Examples

Test Methods

Ionic Resistance in KOH electrolyte is a measure of a separator's resistance to the flow of ions, and was determined as follows. Samples were cut into small pieces (1"×1") and soaked in 35% potassium hydroxide overnight to ensure thorough wetting. Samples were sandwiched between two Teflon® shims with a 1 cm$^2$ window exposing the sample. The sandwich of Teflon® shims and sample was placed in a resistance cell having two platinum electrodes such that the window was facing the two electrodes. The resistance was measured at 1 KHz using an HP milliohmeter. The measurement was repeated without any separator between the Teflon® shims. The difference between the two readings is the resistance (milliohms) of the sample. The separator resistance is then multiplied by the area of the electrodes (1 cm$^2$ in this case) and the results are reported in milliohms-cm$^2$.

Basis Weight was determined by ASTM D-3776, which is hereby incorporated by reference and reported in g/m$^2$.

Porosity was calculated by dividing the basis weight of the sample in g/m$^2$ by the polymer density in g/cm$^3$ and by the sample thickness in micrometers and multiplying by 100 and subsequently subtracting from 100%, i.e., percent porosity=100−basis weight/(density×thickness)×100.

Fiber Diameter was determined as follows. Ten scanning electron microscope (SEM) images at 5,000× magnification were taken of each fine fiber layer sample. The diameter of eleven (11) clearly distinguishable fine fibers were measured from the photographs and recorded. Defects were not included (i.e., lumps of fine fibers, polymer drops, intersections of fine fibers). The average (mean) fiber diameter for each sample was calculated.

Thickness was determined by ASTM D1777, which is hereby incorporated by reference, and is reported in mils and converted to micrometers.

Mean Flow Pore Size was measured according to ASTM Designation E 1294-89, "Standard Test Method for Pore Size Characteristics of Membrane Filters Using Automated Liquid Porosimeter" which approximately measures pore size characteristics of membranes with a pore size diameter of 0.05 μm to 300 μm by using automated bubble point method from ASTM Designation F 316 using a capillary flow porosimeter (model number CFP-34RTF8A-3-6-L4, Porous Materials, Inc. (PMI), Ithaca, NY). Individual samples (8, 20 or 30 mm diameter) were wetted with low surface tension fluid (1,1,2,3,3,3-hexafluoropropene, or "Gatwick," having a surface tension of 16 dyne/cm). Each sample was placed in a holder, and a differential pressure of air was applied and the fluid removed from the sample. The differential pressure at which wet flow is equal to one-half the dry flow (flow without wetting solvent) is used to calculate the mean flow pore size using supplied software.

Tensile Strength was measured according to ASTM D5035-95, "Standard Test Method for Breaking Force and Elongation of Textile Fabrics (Strip Method)" and was reported in kg/cm$^2$.

Surface Area was measure using a BET method. Branaur, Emmet and Teller (BET) theory relates the amount of gas adsorption on a solid surface to surface area. One gram of sample was placed in a sample chamber and placed in liquid nitrogen to be degassed under vacuum. After any surface adsorbed gases have been removed from the sample surface, nitrogen is introduced to the sample. The volume of nitrogen consumed by surface adsorption is measured and related to surface area.

The ammonia trapping capacity was measured by ASTM D7129-09 "Standard test method for determination of ammonia trapping in a grafted battery separator". The test measures amount of ammonia retained by separator when a predetermined amount of separator and ammonia hydroxide are conditioned under a controlled temperature for a day.

Four different levels of sulfonation on the stretch bonded nonwoven webs were carried out using the vapor phase surface sulfonation of webs described in U.S. Pat. No. 3,684,554, issued Aug. 15, 1972. The basic process involves contacting the dry polymer web with continuous blast of gaseous SO$_3$ (2-15% volume in dry inert gas) that can run continuously at high speed (100-200 ft/sec). The sulfonated polymer web was rinsed with DI water.

The % sulfur on the sulfonated samples was measured by Micro-Analysis, Inc, (Wilmington DE) Sulfur analyses are performed by one of two procedures. In the Carlo Erba 1108 Sulfur Autoanalyzer, samples are weighed on an electronic microbalance and then introduced into the autoanalyzer which is maintained under a positive pressure with the carrier gas of helium. Dynamic flash combustion takes place at approximately 1400° C. in an oxygen atmosphere. Quantitative combustion is achieved by passing the mixture of gases over tungstic anhydride on alumina to remove any fluorine and then over the oxidizing agent tungstic anhydride. The mixture is then passed over copper to remove excess oxygen and to reduce the oxides of nitrogen to elemental nitrogen. The resulting mixture is directed to the chromatographic column containing Perapak PQS which is maintained at a constant temperature in the range 60° C.-80° C., and the individual components are separated and sulfur is eluted as sulfur dioxide. The sulfur dioxide is measured with a thermal conductivity detector whose signal feeds to a computer for data processing.

Using the LECO CHNS•932 analyzer, the products of combustion in a CHNS analysis are CO$_2$, H$_2$0, NO$_x$, and SO$_x$. The gases, which are carried through the system by the helium carrier, are swept through the oxidation tube packed with WO$_3$ and copper. The copper removes excess oxygen to complete the conversion to $SO_2$. Oxides of Nitrogen are reduced to $N_2$. The gas mixture is swept through the $H_2O$ infrared detection cell, and then passed through a water trap where $H_2O$ is removed. The remaining gaseous mixture is then passed through $SO_2$, and $CO_2$ IR cells, respectively. The $SO_2$, and $CO_2$ are then removed and $N_2$ is passed through a thermal conductivity detector. The signals are fed to a computer for data processing.

Examples 1 and 2 representing nonwoven sheets of the present invention were made from flash spinning technology as disclosed in U.S. Pat. No. 7,744,989, incorporated herein by reference with additional thermal stretching prior to sheet bonding. Unbonded nonwoven sheets were flash spun from a 20 weight percent concentration of high density polyethylene having a melt index of 0.7 g/10 min (measured according to ASTM D-1238 at 190° C. and 2.16 kg load) in a spin agent of 60 weight percent normal pentane and 40 weight percent cyclopentane. The unbonded nonwoven sheets of Examples 1 and 2 were stretched and whole surface bonded. The sheets were run between pre-heated rolls at 146° C., two pairs of bond rolls at 146° C., one roll for each side of the sheet, and backup rolls at 146° C. made by formulated rubber that meets Shore A durometer of 85-90 and two chill rolls. Examples 1 and 2 were stretched 20% between two pre-heated rolls with 10 cm span length at a rate 30.5 m/m in at bonding temperature of 146° C. Example 1 was calendered under nip pressure at 500 PLI and Example 2 was made without the calendering. Comparative Example A was Tyvek® 1056D (available from DuPont of Wilmington, DE), a commercial flash spun nonwoven sheet product of basis weight 54.4 gsm. The sheet physical properties are given in Tables 1 and 2.

Comparative Example B was prepared similarly to Examples 1 and 2, except without the sheet stretching. The unbonded nonwoven sheet was whole surface bonded as disclosed in U.S. Pat. No. 7,744,989. Each side of the sheet was run over a smooth steam roll at 359 kPa steam pressure and at a speed of 91 m/min.

Comparative Examples C and D are commercial Spunbond-Meltblown-Spunbond (SMS) laminated products purchased from Midwest Filtration Co. Cincinnati, OH and Comparative Example E is a commercial nonwoven made of Polypropylene and is used as a separator for NiMH batteries.

Tables 1 and 2 show how examples of this invention compared to the comparative examples that were tested. Data in Tables 1 and 2 are for samples that were not sulfonated.

TABLE 1

| Sample | Basis Weight (grams/meter$^2$) | Thickness (μm) @10 KPa | Porosity (%) (calculated) |
|---|---|---|---|
| Example 1 | 37.3 | 91.4 | 57.5% |
| Example 2 | 40.7 | 182.9 | 76.8% |
| Comparative Example A | 54.2 | 172.7 | 67.2% |
| Comparative Example B | 54.6 | 234.3 | 75.7% |
| Comparative Example C | 61.0 | 381.2 | 83.3% |
| Comparative Example D | 88.1 | 491.7 | 81.3% |
| Comparative Example E | 63.8 | 144.2 | 53.8% |

TABLE 2

| Sample | Minimum Pore Size (μm) | Mean Pore Size (μm) | Maximum Pore Size (μm) | Maximum Pore Size/ Mean Pore Size | Maximum Pore Size/ Minimum Pore Size | Surface Area (m$^2$g) |
|---|---|---|---|---|---|---|
| Example 1 | 0.5 | 3.4 | 12.0 | 3.5 | 22.0 | 1.15 |
| Example 2 | 0.6 | 8.3 | 22.6 | 2.7 | 37.7 | 0.72 |
| Comparative Example A | 0.2 | 2.1 | 7.4 | 3.5 | 38.4 | 4.80 |
| Comparative Example B | 0.4 | 2.9 | 10.0 | 3.4 | 22.9 | 3.43 |
| Comparative Example C | 6.5 | 9.8 | 20.7 | 2.1 | 3.2 | 0.41 |
| Comparative Example D | 4.3 | 7.7 | 23.7 | 3.1 | 5.6 | 0.47 |
| Comparative Example E | 3.4 | 13.3 | 36.1 | 2.7 | 10.5 | 0.22 |

Table 3 shows the results obtained before and after sulfonation. Examples 1-1 and 2-1 demonstrated superior ammonia trapping ability after sulfonation with only a small loss in tensile strength.

TABLE 3

| Sample | Sulfur content (%) | Ammonia trapping (mmole/g) | MD Tensile Strength (N/cm) |
|---|---|---|---|
| Example 1 | 0 | 0 | 38.8 |
| Example 1-1 | 3.62 | 0.1679 | 25.7 |
| Example 2 | 0 | 0 | 40.7 |
| Example 2-1 | 2.02 | 0.4479 | 37.6 |
| Comparative Example C | 0.0 | 0.0 | 22.1 |
| Comparative Example C-1 | 1.5 | 0.176 | 9.9 |
| Comparative Example D | 0.0 | 0.00 | 41.3 |
| Comparative Example D-1 | 3.1 | 0.13 | 15.7 |

We claim:

1. A nonwoven sheet comprising polymeric plexifilamentary fibers wherein the sheet is whole surface bonded and has a surface area of 0.5-1.5 m$^2$/gram, and a maximum pore size that is equal to or more than 2.5 times the mean flow pore size and more than 11 times the minimum pore size.

2. The sheet of claim 1 wherein the polymer is polyethylene.

3. The sheet of claim 1 having a basis weight of from about 37-45 gsm.

4. The sheet of claim 1 wherein the polymeric fibers are sulfonated and contain at least 0.67% by weight of sulfur.

5. The sheet of claim 1 wherein the fibers have a number average fiber diameter greater than 1 micrometer for 100% of the fibers.

6. The sheet of claim 3 having a basis weight of from about 37-41 gsm.

7. The sheet of claim 4 wherein the sulfonated sheet retains at least 70% of its machine direction (MD) tensile strength relative to an identical sheet not subjected to sulfonation.

8. An electrochemical cell separator comprising the nonwoven sheet of claim 1.

9. A nonwoven sheet comprising polymeric plexifilamentary fibers the sheet being produced by flash spinning a solution of 12% to 24% by weight polyethylene in a spin agent consisting of a mixture of normal pentane and cyclopentane at a spinning temperature from about 205° C. to 220° C. to form plexifilamentary fiber strands and collecting the plexifilamentary fiber strands into an unbonded web, and uniaxially stretching the unbonded web in the machine direction between heated draw rolls at a temperature between about 124° C. and about 154° C., positioned between about 5 cm and about 30 cm apart and stretched between about 3% and 25% to form the stretched web,
wherein the sheet is whole surface bonded and has a surface area of 0.5-1.5 $m^2$/gram and a maximum pore size that is equal to or more than 2.5 times the mean flow pore size and more than 11 times the minimum pore size.

10. The sheet of claim 9 further comprising the step of bonding the stretched web between heated bonding rolls at a temperature between about 124° C. and about 154° C. to form the nonwoven sheet.

11. The sheet of claim 9 wherein the sheet has a basis weight of from 37-45 gsm.

12. The sheet of claim 11 wherein the sheet has a basis weight of from 37-41 gsm.

13. The sheet of claim 10 wherein the sheet has a basis weight of from 37-45 gsm.

14. The sheet of claim 13 wherein the sheet has a basis weight of from 37-41 gsm.

* * * * *